United States Patent [19]

Franzen et al.

[11] 4,230,943

[45] Oct. 28, 1980

[54] MASS SPECTROMETER

[75] Inventors: Jochen Franzen, Wildehausen; Gerhard Weiss, Varrel I, both of Fed. Rep. of Germany

[73] Assignee: Dr. Franzen Analysentechnik GmbH & Co. Kommanditgesellschaft, Bremen, Fed. Rep. of Germany

[21] Appl. No.: 958,414

[22] Filed: Nov. 7, 1978

[30] Foreign Application Priority Data

Dec. 8, 1977 [DE] Fed. Rep. of Germany ....... 2754685

[51] Int. Cl.[2] ........................ B01D 59/44; H01J 39/34

[52] U.S. Cl. .................................... 250/281; 250/283; 250/292

[58] Field of Search ............... 250/281, 282, 288, 292, 250/294, 295, 296, 396 R, 397; 313/361, 432, 439

[56] References Cited

U.S. PATENT DOCUMENTS

| | | | |
|---|---|---|---|
| 3,209,147 | 9/1965 | Dupouy et al. | 250/396 |
| 3,244,990 | 4/1966 | Herb et al. | 250/281 |

*Primary Examiner*—Bruce C. Anderson
*Attorney, Agent, or Firm*—Toren, McGeady and Stanger

[57] ABSTRACT

A mass spectrometer, including an ion source, a mass filter and at least one ion detector, wherein the mass filter and ion detector are not arranged in alignment but are laterally staggered. Between the mass filter and the ion detector, there is arranged an elongated electrostatic, essentially cylinder-shaped, radial guide field. This guide field guides the ions with a velocity component which extends axially to the guide field in elliptical helical paths about its axis toward the input of the ion detector.

11 Claims, 4 Drawing Figures

MASS SPECTROMETER

FIELD OF THE INVENTION

The invention relates to a mass spectrometer, including an ion source, a mass filter and at least one ion detector, wherein the mass filter and ion detector are not arranged in alignment but are laterally staggered.

BACKGROUND OF THE INVENTION

A mass spectrometer of the type considered herein generally consists of an ion source of any chosen design, for example, an ionization chamber for chemical ionization, as described in the German Offenlegungsschrift of Patent Application P No. 27 37 852.5; a mass filter, particularly a quadrupole mass filter of the type described in the German Patent No. 444,900, for example, as produced according to the German Offenlegungsschrift of Patent Application P No. 27 37 903.9 and its first patent of addition; and an ion detector.

It is known to arrange in axial alignment the ion sources, mass filters and detectors in the recited order, this arrangement generally being called an "in-axis" arrangement. This arrangement has the disadvantage that, due to the just described direct "visual contact" of source and ion detector, all neutral particles which, coming from the source, travel through the mass filter without being influenced and reach the detector. Depending on the type of the detector, this feature can generate an undesired background current in the detector. Such neutral particles could be, in particular, excited or metastable, neutral molecules and photons in the ultraviolet or soft X-ray range. A secondary-electron multiplier is usually used as detector.

To reduce this unwanted background current which occurs due to the direct "visual contact" between source and detector, the detector was laterally staggered relative to the axis of the mass filter. This arrangement is called an "off-axis" arrangement. Ionic current measurements which reach the indicating limit of a mass spectrometer, in particular, make such an "off-axis" arrangement of the detector necessary in order to improve the signal-background ratio of the detector.

For this purpose, it is necessary to ion-optically couple the mass filter, particularly a quadrupole mass filter, and "off-axis" ion detector. This is primarily done in a known manner by electrostatic deflection fields which are generated by suitably shaped sheet metal electrodes. Moreover, arrangements are known which solely utilize the attractive action (to positive ions) of the high negative potential of the first dynode of a secondary-electron multiplier. This potential typically lies in the range from 2000 to 3000 volts.

However, in such deflection arrangements, there is the disadvantageous effect that all multipole mass filters which have heretofore become known and are used in mass spectrometers have the property that the ions to be examined, upon emerging from the mass filter, have an energy distribution and an angular distribution which depend on the ion mass and the phase of the multipole-high frequency fields. As a result, all "off-axis" deflection arrangements which correspond to the present state of the art and, which are merely based on electrostatic repulsive or attractive fields, lead, through the mass-dependent energy and angular distribution of the ions, to a more or less large mass dependency of the ion deflection. Particularly disadvantageous is the insufficient degree of efficiency in "off-axis" arrangements of the design which is used today.

OBJECTS OF THE INVENTION

An object of the invention, therefore, is directed at improving a mass spectrometer of the above-mentioned type while avoiding the above-described disadvantages. More particularly, an object of the invention is to provide a mass spectrometer which ensures a reliable guidance of the ions to be examined between mass filter and ion detector. According to the invention, these objects are achieved in a mass spectrometer of the above-mentioned type wherein, between mass filter and ion detector, there is arranged an elongated electrostatic, essentially cylindrical, radial guide field which guides the ions with a velocity component which is axial to the guide field in elliptic helical paths about its axis toward the input of the detector.

SUMMARY OF THE INVENTION

In accordance with the present invention, a mass spectrometer comprises an ion source, a mass filter and at least one ion detector. The mass filter and the ion detector are arranged not in alignment but staggered to each other. An elongated electrostatic, essentially cylindrical radial guide field having an axis is arranged between the mass filter and the ion detector for guiding ions with a velocity component extending axially to the guide field into elliptical helical paths about the axis of the guide field toward the input of the detector.

For a better understanding of the present invention, reference is made to the following description and accompanying drawings while the scope of the invention will be pointed out in the appended claims.

BRIEF DESCRIPTION OF THE DRAWINGS

In the drawings:

FIG. 1 shows a schematic, sectional representation of a first embodiment of a portion of the mass spectrometer of the present invention, wherein the guide wire is stretched through.

DESCRIPTION OF THE PREFERRED EMBODIMENTS

Figure 1:
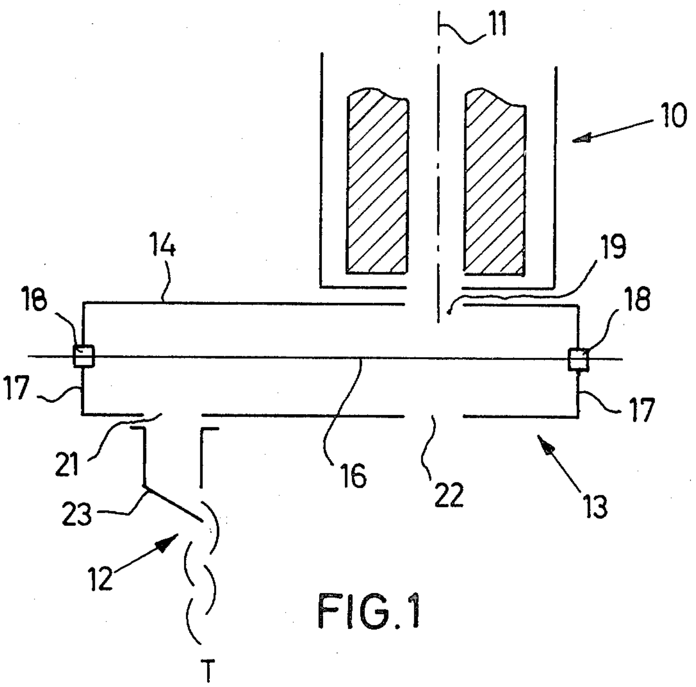

The mass spectrometer shown in FIG. 1 includes a quadrupole mass filter 10 and a secondary-electron multiplier (SE) 12 as ion detector. The secondary-electron multiplier 12 is staggered relative to the axis 11 (shown in dash-dotted lines) of the quadrupole mass filter 10. Quadrupole mass filter 10 and secondary-electron multiplier 12 are ion-optically connected through a particle guide arrangement 13.

The particle guide arrangement 13 includes a housing 14 which extends between and is perpendicular to the longitudinal axes of quadrupole mass filter 10 and secondary-electron multiplier 12. A metal wire 16 is strung in the longitudinal axis of the housing 14 and is fastened at the end faces 15 of the housing 14 by means of insulation members 18. The wire 15 is biased to an electrical potential which attracts the ions which emerge from the quadrupole mass filter 10 and which are detected by means of the secondary-electron multiplier 12.

The housing 14 has openings 19 and 21 which respectively are connected to the quadrupole mass filter 10 and the secondary-electron multiplier 12. The openings 19, 21 are arranged in such a manner that the major portion of the ions to be examined and emerging from the quadrupole mass filter 10 enter the housing 14 through the opening 19 and can leave the housing 14 through the opening 21 to the secondary-electron multiplier 12.

In the direction of the axis 11 of the quadrupole mass filter, the housing 14 has an opening 12. Neutral particles which may exist or which are created by the discharging of ions at the metal wire 16 can leave the housing 14 through this opening 22. The opening 22 is located opposite the opening 19 for the entry of the particles from the quadrupole mass filter 10. At the opening 21, a tubular extension 23 is connected to the first dynode of the secondary-electron multiplier 12. This extension 23 forms an ion-optical lens together with the opening 21 serving as exit for the ions from the particle guide arrangement 13. This tubular extension 23 is so electrically biased that the ions to be examined are attracted. To the housing 14, there is also applied a voltage whose sign is opposite in sign of the voltage of the metal wire 16.

In explaining the operation of the inventive mass filter, it is useful to mention beforehand that, in a mass spectrometer of an ion source (not shown) which is at the input of the quadrupole mass filter 10, charged particles or ions are produced which are filtered by the quadrupole mass filter 10. Therefore, depending on the respective throughput mass, only a certain portion of the ions from the quadrupole mass filter 10 is allowed to enter through the opening 19 into the housing 14 of the particle guide arrangement 13.

An electric voltage is applied to the metal wire 16. The housing 14 is also electrically biased. In the interior of the housing 14, a cylindrical guide field is formed in such a manner that a force acts on the ions in the housing 14 in the direction of the metal wire. As a result of this force, the ions are forced into elliptical paths about the metal wire 16.

Neutral particles entering the housing 14 from the quadrupole mass filter 10 and a portion of the neutral particles formed due to discharging at the metal wire 16 leave the housing 14 through the opening 22.

Figure 2:
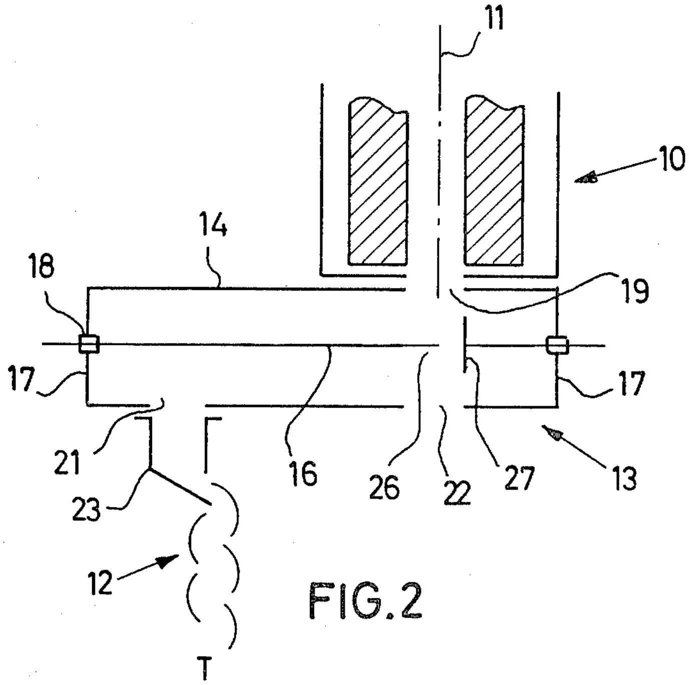
FIG. 2 shows a schematic representation of another embodiment of the portion of the inventive mass spectrometer shown in FIG. 1, wherein the guide wire ends freely in the region of the mass filter and wherein a pusher plate is arranged opposite the guide wire.
Figure 3:
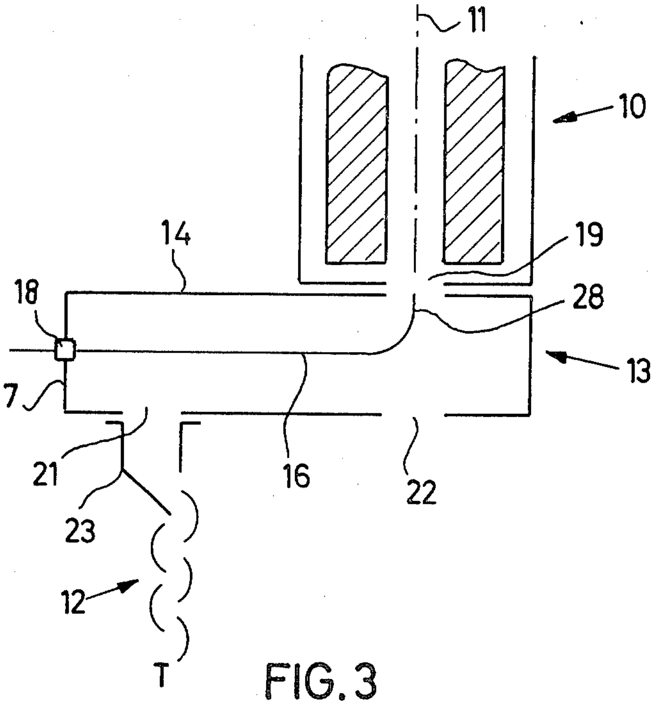
FIG. 3 shows the schematic representation of another embodiment of the portion of the inventive mass spectrometer, wherein the guide wire is at its free end bent towards the axis of the mass filter.
Figure 4:
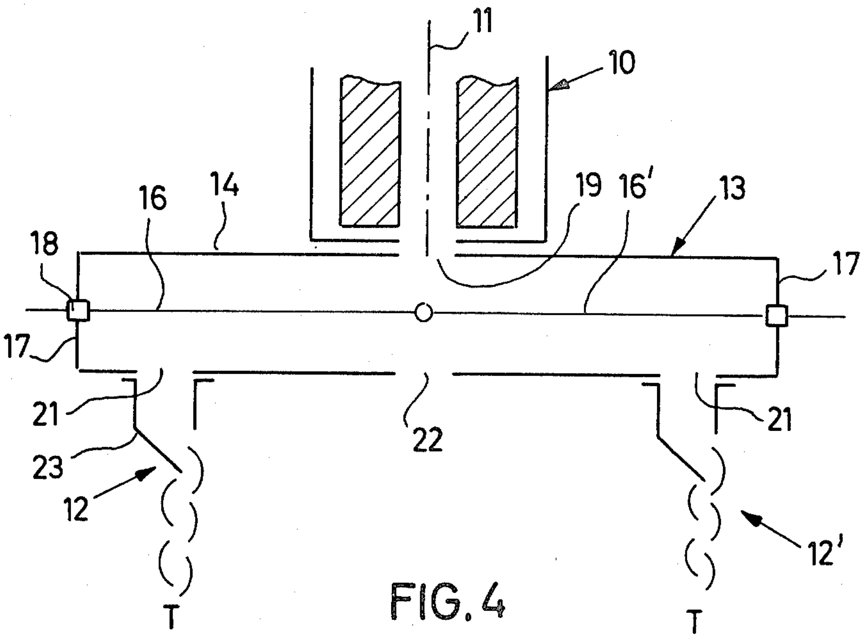
FIG. 4 shows the schematic representation of an embodiment of the portion of the mass spectrometer, with two ion detectors.

In the embodiment of FIGS. 2 to 4, the same reference numerals are used for the same parts of the mass spectrometer.

In the embodiment according to FIG. 2, the metal wire 16 is fastened, insulated against the housing 14, only with one end; namely, in the vicinity of the secondary-electron multiplier 12, at the end face 17 of this side of the housing, while the metal wire 16 ends freely in the housing 14 abreast of the opening 19 to the quadrupole metal filter 10. Opposite the free end 26 of the metal wire 16, there is a pusher plate 27 which is biased with the same sign as the charge of the ions to be examined, so that the plate 27 repels these ions.

The manner of operation of the embodiment of the mass spectrometer or the particle guide arrangement 13 shown in FIG. 2 essentially corresponds to the one of FIG. 1; however the particles are repelled by the pusher plate 27 and, in this manner, an increased velocity component along the metal wire 16 toward the secondary-electron multiplier 12 is forced onto the particles.

In the embodiment of the inventive mass spectrometer shown in FIG. 3, the metal wire 16 is fastened in the vicinity of the secondary-electron multiplier 12 at the end face 17. With its free end 28, the metal wire 16 is bent at the mass filter 10 into the opening 19 for the entry of the ions to be examined in such a manner that its free end 28 is essentially aligned with the axis of the quadrupole mass filter 10. As a result, the ions emerging from the quadrupole mass filter through the opening 19 can be received directly by the guiding metal wire 16 and can be guided along the metal wire 16 in elliptical helical paths until they reach the vicinity of the outlet opening 21.

FIG. 4 shows a mass spectrometer with a twin arrangement for particle guidance which is constructed symmetrically to the multipole axis. In this case, the housing 14 has, in alignment with the axis 11 of the quadrupole mass filter 10, an opening 19 for the entry of the particles and a through-opening 22 for possibly existing neutral particles. At both ends of the housing 14 of the particle guide arrangement 13 and on that side of the housing 14 which is located opposite the quadrupole mass filter 10, a secondary-electron multiplier 12, 12' is correspondingly arranged. The ions to be examined enter the secondary-electron multiplier through the openings 21 from the housing 14. The metal wire 16, 16' which guides the ions is fastened at both end faces 17 of the housing 14 by means of insulating members 18 and is divided in the middle between the openings 19 and 22 into two halves 16, 16', so that both wire halves 16, 16' in alignment with their axes, face each other in the center of the inlet opening without touching each other. In the shown embodiment, the ends of the wires which face each other in this manner are connected by means of a small glass bead 29. Thus, the connection is mechanically stable and, simultaneously, the wire halves are electrically insulated from each other.

When at least one of the wires 16 is biased with a charge which attracts the particles to be examined, the mass spectrometer of the embodiment according to FIG. 4 essentially operates as that of the embodiment of FIG. 1.

More particularly, however, different electric voltages can be applied to both wires, wherein preferably a wire half has a positive potential, while the second wire half has a negative potential. By a simple pole reversal of the wire voltages, the ionic current to be examined is then guided to separate detectors.

In the shown embodiment, the first secondary-electron multiplier 12 has a high gain in order to be able to perform sensitive measurements of individual ionic currents, while the secondary-electron multiplier 12' has an appropriately small gain for the measurement of the total ionic current. By a simple pole reversal of the wire voltages and a simultaneous switching of the quadrupole from single mass filter to a high-pass filter which, from a limit mass, lets pass all higher masses, there exists the possibility to measure very exactly and without destroying the detectors the individual ionic current as well as the total ionic current.

When the secondary-electron multipliers 12, 12' are provided with essentially the same gain and when opposite signs for the bias voltages of the two wires 16, 16' are chosen, there results the possibility, with appropriate polarity of the first dynodes, to prove positive ions in one of the secondary-electron multipliers and negative ions of equal mass in the other secondary-electron multiplier. This is so because the quadrupole mass filter has the same mass-separating effect on the positive as well as on the negative bias.

As discussed above, the guide field of the invention can be generated by an essentially linear conductor which essentially extends between mass filter and ion detector and is charged with a charge which is opposite to the one of the ions to be examined.

Further according to an advantageous embodiment discussed above, the conductor is a metal wire which carries an electrical voltage. Another embodiment provides that the conductor is stretched in an oblong housing in an insulated manner. An electrical voltage is applied between wire and housing in such a manner that the wire carries an average voltage which has the opposite sign of the ion charge, a negative voltage being applied to the wire, particularly for the guidance of positive ions.

A coaxial arrangement of electric condensor has a distribution of potential corresponding to the following equation:

$$U(r) = U_o(\ln \frac{r}{r_a}) / (\ln \frac{r_i}{r_a})$$

In this equation, $r_i$ and $r_a$ are the radii of inner and outer conductors, in the present case, the outer conductor being a housing which has a circular cross section. $U_o$ is the potential of the inner conductor relative to the outer conductor. When charged particles (charge q) reach the region of the guide field, they are exposed to a force which is directed radially relative to the conductor arrangement. This force amounts to $$K = \text{grad. } U(r) \cdot q;$$

due to the effect of this force, these particles travel on elliptic paths about the central conductor. When the charged particles have an axial drift, the plane paths are transformed into elliptical helical paths about the conductor. Accordingly, this movement of the ions takes place, guided by the radial field, in axial direction of the guide field.

According to additional embodiments discussed, the housing has lateral openings for allowing the ions to be examined and allow unwanted neutral particles, which may exist, to enter or leave.

The conductor is advantageously clamped by fastening only on one side, wherein particularly the free end of the conductor is bent toward the mass filter in the direction of the axis of the mass filter.

In a preferred embodiment set forth above, in the region of the location where the ions to be examined enter the guide field, there is arranged, essentially perpendicular relative to the axis of the guide field, a pusher plate which provides the ions to be examined with repulsive voltage.

An embodiment of the invention provides that two ion detectors are arranged, that the two ion detectors are staggered relative to the mass filter, and that the mass filter is connected to each detector, through a corresponding elongated guide field. Between the mass filter and each of the two ion detectors, there is preferably arranged an electrically biased conductor for each detector, the conductors being insulated from one another. When voltages of opposite signs are then applied to the conductors, positive and negative ions can be measured simultaneously in this manner.

Further discussed above, an embodiment which is characterized in that one of the ion detectors has a high gain while the other has a relatively little gain, the twofold particle-guide arrangement to two separate ion detectors, particularly secondary-electron multipliers, open up the possibility of quasi-simultaneous measurements of individual ionic currents and the total ionic current; this measurement can be achieved by quick switching of the voltage in the wires. Sensitive individual current measurements are performed with the high gain detector, while the low gain detector is provided for the measurement of the total ionic current. By a simple pole reversal of the voltages of the two wires which are insulated from each other and by a simultaneous switching of the single-mass filter to a high-pass filter which, in excess of a limit mass, lets pass all ion masses, the respective ionic currents are fed to the assigned detectors.

While the foregoing description and drawings represent the preferred embodiments of the present invention, it will be obvious to those skilled in the art that various changes and modifications may be made therein without departing from the true spirit and scope of the present invention.

What is claimed is:

1. A mass spectrometer, comprising:
   - an ion source;
   - a mass filter having an axis;
   - at least one ion detector;
   - said mass filter and said ion detector being arranged not in alignment but laterally staggered to each other; and
   - a metal wire for the generation of an elongated electrostatic, essentially cylindrical, radial guide field extending between said mass filter and said ion detector, which guide field guides ions with a velocity component extending axially to the guide field into elliptic helical paths about its axis toward the input of said ion detector, said metal wire essentially extending between said mass filter and said ion detector, said wire being charged with a charge opposite to ions to be examined, said wire being fastened by clamping only on one side and, on its free end, being bent toward said mass filter in the direction of said axis of said mass filter.

2. A mass spectrometer, comprising:
   - an ion source;
   - a mass filter;
   - at least on ion detector;
   - said mass filter and said ion detector being arranged not in alignment but laterally staggered to each other;
   - a metal wire for the generation of an elongated electrostatic, essentially cylindrical, radial guide field extending between said mass filter and said ion detector, which guide field guides ions with a velocity component extending axially to the guide field into elliptical helical paths about its axis toward the input of said ion detector, said metal wire essentially extending between said mass filter and said ion detector, said wire being charged with a charge opposite to ions to be examined, said wire being fastened by clamping only on one side; and a pusher plate being arranged opposite the free end of the wire in the region where the ions to be examined enter said guide field essentially perpendicular to said axis of said guide field, said pusher plate having a voltage which repels the ions to be examined.

3. A mass spectrometer, comprising:

an ion source;

a mass filter;

at least one ion detector;

said mass filter and said ion detector being arranged not in alignment but laterally staggered to each other; and an electrically biased metal wire having two conducting portions for the generation of an elongated electrostatic, essentially cylindrical, radial guide field extending between said mass filter and said ion detector, which guide field guides ions with a velocity component extending axially to the guide field into elliptic helical paths about its axis toward the input of said detector, at least two ion detectors being arranged staggered relative to said mass filter and said mass filter being connected to each detector through an elongated guide field, said wire being provided between said mass filter and each of said ion detectors, wherein said conducting portions of said wire are insulated from one another and wherein voltages of different signs are applied to said conducting portions.

4. A mass spectrometer according to claim 1 or 2, wherein said guide field is arranged essentially perpendicular to the axis of said mass filter and to the longitudinal extension of said ion detector.

5. A mass spectrometer according to claim 1 or 2, wherein said guide field is disposed between two longitudinally extending, parallel plates which preferably are arranged essentially perpendicular to the longitudinal extensions of said mass filter and said ion detector.

6. A mass spectrometer according to claim 1 or 2, including an elongated housing, wherein said metal wire is strung in an insulated manner within said elongated housing, which housing has a predetermined geometric cross-section and lateral openings which allow the ions to be examined, and possibly existing unwanted neutral particles to enter or leave.

7. A mass spectrometer according to claim 1 or 2, wherein the ions enter and leave said guide field tangentially to an equipotential surface.

8. A mass spectrometer according to claim 3, wherein said metal wire portions, which are electrically insulated from one another, are mechanically connected to each other, particularly by means of a glass connection.

9. A mass spectrometer according to claim 6, wherein, to said ion detector or detectors, there is connected a tubular extension for coupling the ions out of said guide field, said tubular extension, together with the outlet opening of said guide housing, forming an ion-optical lens for the ions to be examined.

10. A mass spectrometer according to claim 1 or 2, wherein said mass filter is a multipole mass filter, particularly a quadrupole mass filter.

11. A mass spectrometer according to claim 1 or 2, wherein said ion detector or detectors are secondary-electron multipliers.

* * * * *